Dec. 5, 1967  G. W. McLEOD  3,356,205
LOG CONVEYOR
Filed Oct. 3, 1966  2 Sheets-Sheet 1
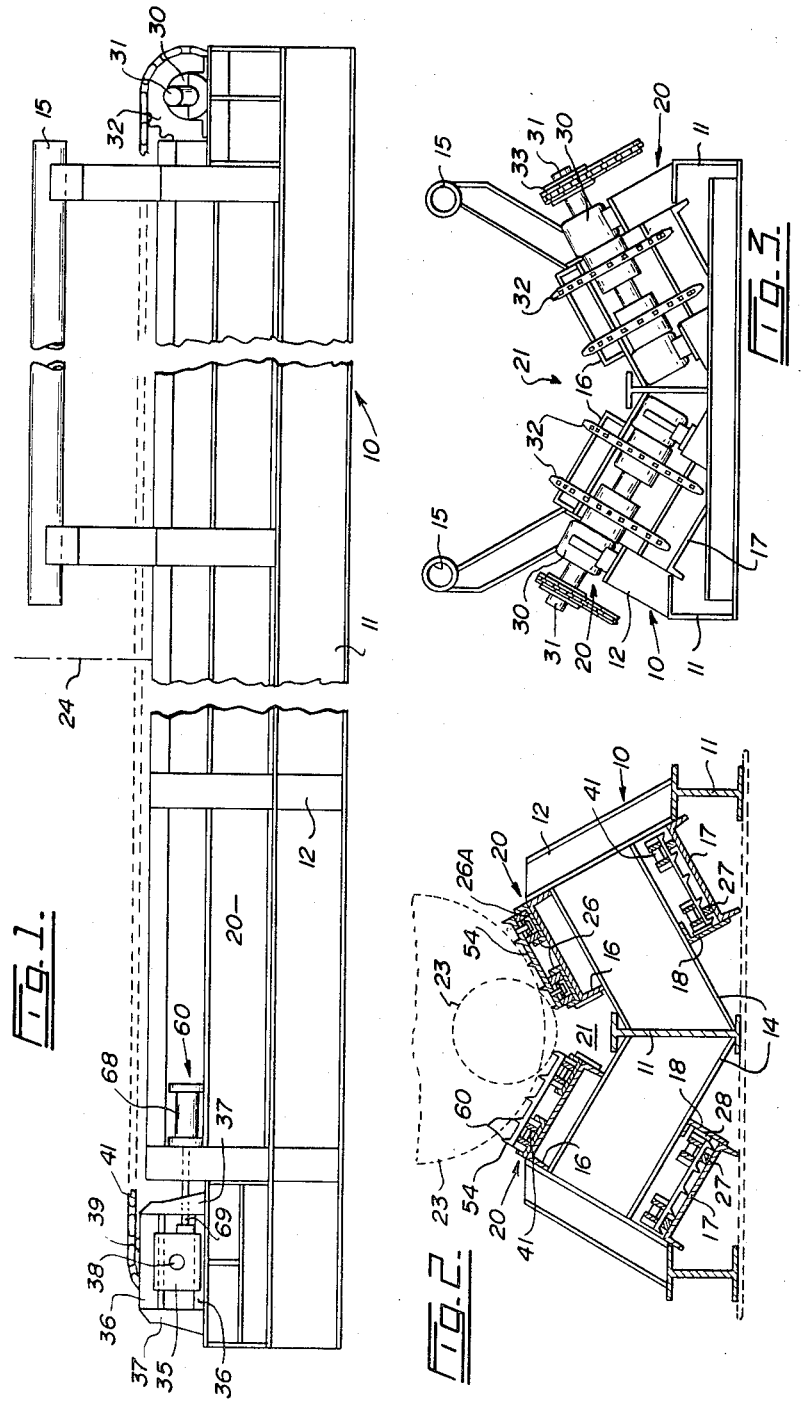

Dec. 5, 1967  G. W. McLEOD  3,356,205
LOG CONVEYOR
Filed Oct. 3, 1966
2 Sheets-Sheet 2
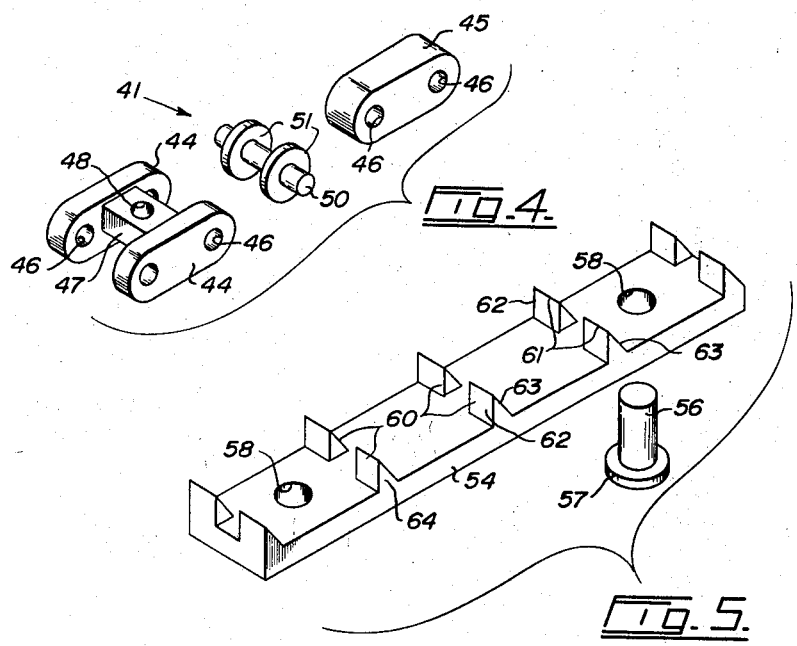
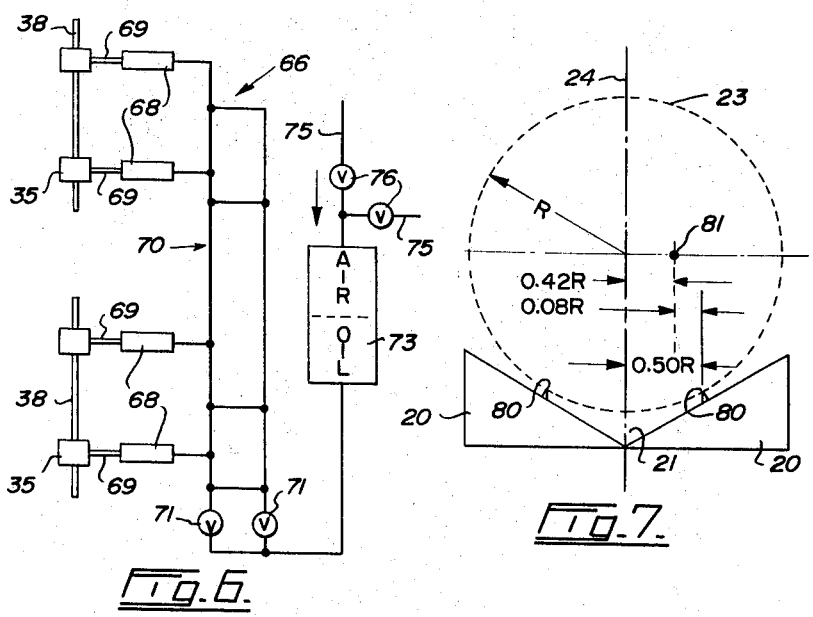

United States Patent Office 3,356,205
Patented Dec. 5, 1967

3,356,205
LOG CONVEYOR
George W. McLeod, Vancouver, British Columbia, Canada, assignor to Letson and Burpee Ltd., a corporation of Canada
Filed Oct. 3, 1966, Ser. No. 583,726
4 Claims. (Cl. 198—162)

ABSTRACT OF THE DISCLOSURE

A conveyor to advance logs endwise to a splitting saw. A V-shaped trough of inclined banks of conveyor chains in contact with the logs, the chains arranged so as to press halves of the sawn logs together.

This invention relates to a conveyor which is particularly intended for use in feeding logs to a saw so that they are cut longitudinally into two approximately equal halves.

Logs being fed to a wood chipper or grinder are first required to be reduced to a maximum cross section before being cut into short lengths or blocks which can conveniently be fed to such machines. Hitherto, logs have been moved from a barker on to a storage deck from where they are transported laterally and intermittently to a log carriage. On the carriage, the logs are secured against displacement and are then cut longitudinally into segments which are judged to be of the required size. If any one of these segments should be found oversize it must be returned to the carriage for further sawing. Obviously this method of processing the log is time consuming and requires the use of additional equipment to shift the slabs, or cants, from one position to another, and to secure them to the carriage.

The present invention overcomes some of these objections to conventional equipment by the provision of a conveyor which will feed logs directly to the saw without the need for dogging or securing equipment of the usual kind. Such an improvement in the art reduces capital and labour costs, increases the mill capacity while decreasing maintenance, and enables this phase of the system to be run by semi-skilled or relatively inexperienced operators.

A further advantage derived from the improved conveyor is that the log is supported in such a way that the saw can make a straight cut without danger of binding in the kerf.

The invention contemplates a conveyor to advance a log to a saw, the conveyor having a V-shaped trough defined by two transversely spaced and inclined banks with each bank being provided with a conveyor chain, the chains having points of contact with the log, which points of contact are positioned relative to the centres of gravity of halves of the sawn log so that said halves have a slight tendency to press together.

Referring to the drawings:

FIGURE 1 is a fragmentary side elevation of the log conveyor.

FIGURE 2 is a vertical section of one of the conveyor banks.

FIGURE 3 is an end elevation of the conveyor with the conveyor chains omitted.

FIGURE 4 is an exploded perspective view of the conveyor chain.

FIGURE 5 is a similar view of a chain flight and its connecting pin.

FIGURE 6 is a diagram of the fluid operated take-up device.

FIGURE 7 is a diagram showing the balance of forces of a log upon the conveyor.

The conveyor consists of an elongated frame 10 having longitudinal members 11 and cross members 12. Each cross member is made up of a number of short length of I-beam or the like which include two inner lengths 14. As shown best in FIG. 2, the lengths 14 are secured to the centre member 11 and are disposed with their axes substantially at a 30° angle to the horizontal, which angle is not critical within about plus or minus 5°.

At one end of the conveyor the members 12 support guard rails 15 which extend to about the centre of the structure.

Mounted on the cross members 12, along each side of the frame 10, is a length of inverted channel which forms a bed 16 for the conveyor. A similar channel extends longitudinally of the frame to provide a track 17 directly opposite the bed 16. The track 17 is spaced from the undersides of the lengths 12 and is connected thereto by an angle 18. Thus, it will be seen that the conveyor is made up of two inclined and separated banks 20 with the angle of inclination of said banks being 30° so as to define a wide V-shaped trough 21 above the banks.

The present structure is adapted to feed logs, shown by the dotted lines 23, to a band saw which is indicated by the chain-dotted line 24 only. The vertically disposed cutting run of the saw 24 extends through the centre of the conveyor with one of the banks 20 passing through the throat of the band saw, viz. between the two spaced apart runs. Obviously, the latter bank would be provided with a removable section, not shown, which would enable the saw blade to be removed and replaced when necessary.

The logs 23 are advanced endwise along the conveyor by endless chains or cables. One such log advancing member may be mounted on each bank 20 but I prefer to use two on each bank for reasons which will be apparent later. To support such twin log advancing members, the bed 16 of each bank is fitted with channels 26 of a suitable hard wearing material, which channels have heightened inner flanges 26A. Opposite the channels 26, the track 17 carries T-shaped guide rails 27 also of a bearing material. Adjoining the innermost rail 27 is a wear strip 28 which is secured to the angle 18.

Referring now to FIG. 3 it will be seen that, at one end of the conveyor, each band 20 is fitted with roller bearings 30 in which an inclined shaft 31 is journalled. The shaft is fitted with transversely spaced sprockets 32 and a chain and sprocket drive 33 connects said shaft to a suitable drive mechanism, not shown.

At the other end of the conveyor each bank is provided with bearings 35, see particularly FIG. 1. These bearings are slidably mounted between upper and lower guides 36 which extend between a pair of supporting standards 37. Journalled in these sliding bearings is a tail shaft 38 mounting two sprockets 39 in alignment with their complementary sprockets 32.

Trained over the sprockets 32 and 39 of each bank are two parallel chains 41, the upper runs of which are mounted on the channels 26. As shown FIG. 2, the lower runs of the chains are supported by the guide rails 27 with the side edge of the innermost chain having sliding contact with the wear strip 28.

Preferably, each chain would be made up of two lengths joined together by suitable removable connectors, not shown. Such an arrangement would facilitate removal and replacement of the saw blade as above described.

FIG. 4 shows that the chains 41 have outer links 44 and inner links 45 which are constructed of heavy, flat bars of metal. The rounded ends of the links are provided with openings 46. A cross bar 47 connects the outer links together as a unit and this bar has an opening 48. The links 44 and 45 are joined together by means of connecting pins 50 which are received in the openings 46. Short sleeves 51 are mounted in the connecting pins to serve as spacers for the inner links 45. Preferably, the ends of the pins 50 are spot welded or otherwise suitably secured to the links 44 with care being taken to leave no obstruction projecting beyond the outer faces of said links which are in sliding contact with the flanges 26A and the wear strip 28.

The two parallel chains on each sloping bank 20 of the conveyor are cross connected by flights 54, see particularly FIG. 5. These flights are formed of flat, rectangular metal bars having a length equal to the spacing between the outer side edges of the connected chains and a width substantially equal to one half the overall length of a link 44 or 45. Pins 56, having heads 57, are used to secure the flights to the chains. An opening 58 is provided near each end of the flights and a pin 56 is inserted from the underside of the chain through an opening 48 in a cross bar 47 so that its upper end is received in the flight opening 58. This unflanged end of the pin is then secured to the flight by welding while leaving the pin free to rotate within the opening 48. Such a method of fastening permits minor displacement longitudinally of corresponding links in the chains without tending to bend the chain in a plane parallel to the sloping bed 16. Displacement of this sort often occurs due to manufacturing tolerance variations, uneven wear and chain stretch.

The top surface of the flights are provided with a number of integrally formed teeth 60 which are equidistantly spaced along the flight in rows of two. Each tooth is triangular to provide a short, sharp, chisel-shaped point 61 which is parallel to the adjacent surface of the flight. The outer face 62 of the tooth is perpendicular to the flight, the inner face 63 is disposed at 30° to the outer face and the two side faces 64 are parallel and also perpendicular to the flight.

The conveyor is provided with a take-up device 66 which is indicated generally in FIGS. 1 and 6. This device consists of four cylinders 68, there being two such cylinders mounted on a cross member 12 near each tail shaft 38. The piston rods 69 of the cylinders are operatively connected to adjacent bearings 35 which journal the tail shafts. A suitable circuit 70 including various control valves 71 connects all cylinders 68 to an air-oil reservoir 73. Included in the circuit 70 are other lines 75 having values 76 which enable the reservoir to be partially filled with oil and charged with compressed air at a pressure selected by the carriage operator.

By use of the device 66 the tail shafts 38 are positioned to exert a constant and positive tension on the chains 41 during operation of the conveyor. The take-up device removes all slack from the chains automatically as it is produced through wear and stretch. The valves 71 are such as to prevent any retraction of the rods 69 which would allow slackening of the chains during reversal of the chain travel.

In a conveyor having inclined banks it is particularly important that the chains be maintained at the proper tension since one bank of the conveyor passes through the band saw throat and for this reason the overall depth of the structure must be kept at a minimum. For example, the space between the track 17 and the underside of the lengths 14 must be kept small. When the chain has such restricted clearance it is important that it be maintained at the proper tension at all times since an excessive amount of chain slack could cause fouling and jamming particularly when the banks are inclined and the chain drive is adapted to be reversed as in the present case.

Logs are fed to the present conveyor in end-to-end relation and in a continuous stream and it will be noted these logs often vary in diameter to quite a large extent. However, regardless of the diameter of a log, as it moves in to the trough it is centered by the inclined banks and is engaged by the chains 41 which advance it towards the saw 24.

A log 23 is sawn through its centre while supported solely by the conveyor chains and obviously it is essential that the log be restrained against lateral movement. Since the teeth 60 have chisel-shaped points 61 extending parallel to the log grain, the teeth readily penetrate the log surface so as to firmly grip and anchor the log. As the teeth enter the log the faces 62 and 63 coact to provide a positive separating force between the two halves of the log as they emerge beyond the saw. This separating force exerted by the teeth acts to resist the natural tendency of the log halves to close the kerf and bind the saw blade. Also, since the tooth faces 64 are flat, vertical surfaces, they provide a firm abutment for the log to resist horizontal saw forces parallel to the log's longitudinal axis which might tend to raise the log off the saw teeth. Thus, it will be seen that the shape and arrangement of the teeth play an important part in steadying a log so that it may be sawn without the use of hold-down means.

The log is also steadied by the small spacing between the chain flight which ensure that the log is not deflected downwardly to any great extent when being acted upon by the saw. This would occur if the spacing of the flights was too great and the log was irregular so that lengths of its surface was unsupported by a flight.

It should be noted the chains of each bank are spaced some distance apart and the flights are long in relation to the width of the chains. This provides a resisting moment against tipping or distortion of the chain which might otherwise occur if a small diameter log was supported by the innermost teeth of the chains.

Referring now to FIG. 7, it will be noted a cross sectional portion of the log is supported upon the chain by two widely spaced contact points 80. Each point may be formed by a single tooth or two or more teeth depending on the diameter of the log. The teeth are sufficiently close together to maintain the 30° slope of the banks. The 30° inclination of the bank 20 is such that the centre of gravity 81 of the log half is positioned a very short distance inside the point 80. Thus, when the log is sawn longitudinally, the two halves are close to the balance point but are just sufficiently out-of-balance that they tend to roll together. This particular balance given to the log halves prevents them from falling apart after the cut is complete but the inward acting force is deliberately kept small to avoid any tendency to bind the saw. By balancing the log in this manner so that a small force of gravity only is holding the two halves together, the log may be sawn without the need for a log splitter or other mechanical means to prevent the saw blade from being pinched or distorted by the log halves.

The slope of the banks retains the chains in firm contact with the flanges 26A and the wear plates 28 so that the flights are always maintained at a minimum distance from the axis of the conveyor. Therefore, when the weight of a log tends to increase this lateral pressure of the chains, the force is resisted and instead is exerted to tend to separate the log halves. This action also holds the log firmly during the cutting and aids separation after cutting.

The conveyor is continuous from the point of saw entry into the log to the saw exit from the log. The log is then firmly supported against lateral movement during the entire saw cut so that a straight cut is made and the saw is not subjected to side strain which might result in breakage.

The embodiments of the invention in which an exclusive property or privilege is claimed are defined as follows:

1. A conveyor adapted to feed a substantially circular log endwise to a vertically disposed saw extending through the conveyor to cut the log longitudinally into two approximately equal parts; said conveyor being characterized by inclined banks defining a V-shaped logreceiving trough, said banks having log advancing means projecting above their inclined top surfaces, said means having contact points with the log surface, which contact points are disposed outwardly of the centres of gravity of the log halves and which tend to roll said halves towards one another; the log advancing means including a pair of chains on each bank, said pair of chains each being cross connected by log engaging flights disposed parallel to the adjoining surface of a bank; and wherein the flights have spaced teeth projecting from their upper surfaces, said teeth having chisel-shaped points disposed parallel to both the adjoining surface of the flight and the longitudinal axis of the conveyor.

2. A conveyor as claimed in claim 1, wherein the outer faces of the teeth are perpendicular to the adjoining surface of the flight and the inner faces of said teeth are vertical.

3. A conveyor as claimed in claim 2, wherein the side faces of the teeth are parallel to one another and perpendicular to the adjoining surface of the flight.

4. A conveyor as claimed in claim 3, wherein the inclined banks are disposed at an angle of between about 25° and 35° to the horizontal.

References Cited

UNITED STATES PATENTS

| | | | |
|---|---|---|---|
| 219,871 | 9/1879 | Olin | 198—178 X |
| 604,822 | 5/1898 | Deweese | 198—178 X |
| 983,702 | 2/1911 | Gerken. | |
| 1,645,406 | 10/1927 | Smith et al. | 198—24 |
| 2,780,343 | 2/1957 | Bunnel | 198—200 X |

HUGO O. SCHULZ, *Primary Examiner.*

EVON C. BLUNK, *Examiner.*

R. J. HICKEY, *Assistant Examiner.*

UNITED STATES PATENT OFFICE
CERTIFICATE OF CORRECTION

Patent No. 3,356,205　　　　　　　　　　　　　　December 5, 1967

George W. McLeod

It is hereby certified that error appears in the above numbered patent requiring correction and that the said Letters Patent should read as corrected below.

In the heading to the printed specification, lines 4 and 5, for "assignor to Letson and Burpee Ltd., a corporation of Canada" read -- assignor to Letson and Burpee Ltd., Vancouver, British Columbia, Canada, a corporation of the Province of British Columbia, Canada --.

Signed and sealed this 7th day of January 1969.

(SEAL)
Attest:

Edward M. Fletcher, Jr.　　　　　　　　　　　　EDWARD J. BRENNER
Attesting Officer　　　　　　　　　　　　　　　Commissioner of Patents